US008617710B2

(12) United States Patent
Auvinen et al.

(10) Patent No.: US 8,617,710 B2
(45) Date of Patent: Dec. 31, 2013

(54) PROCESS FOR COATING COBALT NANOPARTICLES WITH COPPER AND COPPER OXIDE

(75) Inventors: Ari Auvinen, Espoo (FI); Jorma Jokiniemi, Espoo (FI); Pipsa Mattila, Espoo (FI); Unto Tapper, Espoo (FI)

(73) Assignee: Teknologian Tutkimuskeskus VTT, Espoo (FI)

( * ) Notice: Subject to any disclaimer, the term of this patent is extended or adjusted under 35 U.S.C. 154(b) by 0 days.

(21) Appl. No.: 13/577,661

(22) PCT Filed: Feb. 7, 2011

(86) PCT No.: PCT/FI2011/050104
§ 371 (c)(1),
(2), (4) Date: Sep. 20, 2012

(87) PCT Pub. No.: WO2011/098665
PCT Pub. Date: Aug. 18, 2011

(65) Prior Publication Data
US 2013/0224490 A1    Aug. 29, 2013

(30) Foreign Application Priority Data
Feb. 9, 2010 (FI) ..................................... 20105126

(51) Int. Cl.
*B32B 5/16* (2006.01)
(52) U.S. Cl.
USPC ............................. 428/403; 428/404; 427/212
(58) Field of Classification Search
USPC .................................. 428/403, 404; 427/212
See application file for complete search history.

(56) References Cited

U.S. PATENT DOCUMENTS 4,383,852 A * 5/1983 Yoshizawa ........................ 75/363
2006/0177660 A1 * 8/2006 Kumar et al. .................. 428/403

FOREIGN PATENT DOCUMENTS

| EP | 1690617 | | 11/2003 |
| EP | 1690617 | * | 8/2006 |
| JP | 59172209 | | 9/1984 |
| JP | 2000-335026 | | 4/2000 |
| JP | 2000106035 | * | 4/2000 |
| WO | WO 2007/144455 A1 | | 12/2007 |
| WO | WO2007144455 | * | 12/2007 |

OTHER PUBLICATIONS

Subramanian et al, "Development of cobalt-copper nanoparticles . . . " Catalysis Today, 2009, vol. 147, No. 2, p. 100-106.*
Jia Y et al, "Sonochemical preparation fo bimetallic Co/Cu nanoparticles . . . " Materials research Bulletin, 2005, vol. 40, No. 3, p. 1623-1629.*
Jia, et al; "Sonochemical preparation of bimetallic Co/Cu nanoparticles in aqueous solution"; Materials Research Bulletin 40 (2005) 1623-1629; accepted Mar. 29, 2005.
Subramanian, et al; "Development of cobalt-copper nanoparticles as catalysts for higher alcohol synthesis from syngas"; Catalysis Today 147; (2009) 100-016.

* cited by examiner

*Primary Examiner* — Leszek Kiliman
(74) *Attorney, Agent, or Firm* — Thorpe North & Western LLP

(57) ABSTRACT

The present invention relates to a process for forming cobalt nanoparticles and coating them with copper or copper oxide, in which process a copper salt is mixed to a cobalt salt so that the formed salt mixture obtains a cobalt:copper ratio of >1:1, and a reduction is carried out with a reducing gas, whereby nanoparticles are formed while a coating is formed onto their surface.

11 Claims, No Drawings

PROCESS FOR COATING COBALT NANOPARTICLES WITH COPPER AND COPPER OXIDE

BACKGROUND OF THE INVENTION

1. Field of the Invention

The present invention relates to a process for forming cobalt nanoparticles and coating these with copper or copper oxide.

2. Description of Related Art

Generally cobalt has been utilized in industrial nanoparticle applications, such as a catalyst as well as a magnetic and electrically conductive or insulation material. It is previously known to prepare nanoparticles of metals, such as of cobalt, by reducing from metal salts, such as in publications WO 2007/144455, Forsman, J.; Tapper, U.; Auvinen, A, & Jokiniemi, J. ("Production of cobalt and nickel particles by hydrogen reduction". J. Nanoparticle Res. 10 (2008) 745-759) ja Jang, H. D.; Hwang, D. W.; Kim, D Y.; Kim, H. C.; Lee, B. Y. &. Jeong, I. B. ("Preparation of cobalt nanoparticles in the gas phase (I): Kinetics of cobalt dichloride reduction". J Ind. Eng. Chem. 9 (2003) 407-411).

It is also previously known that copper and cobalt do not mix together. Cobalt has been coated with copper, for example in liquid phase (such as in publications US 20060177660 and Subramanian, Nachal Devi; Balaji, G.; Kumar, Ch.alia S. S. R.; Spivey, James J. Catalysis Today (2009), 147(2), 100-106). Usually other metals are found in nanoparticles with cobalt, especially in catalysts. Other nanoparticles of cobalt and copper mixtures has been prepared among others by ball mill beater (such as in publication Angeles, J.; Velazquez, C.; Calderon, H. A. NSTI Nanotech 2007, Nanotechnology Conference and Trade Show, Santa Clara, Calif., United States. May 20 24 (2007), Volume 4, 273-276). Also nanoparticles of copper oxide has been produced (such as in publication Ghodselahi, T.; Vesaghi, M. A., Sh.afiekbani, A,; Baghizadelh., A.; Lantrieii, M. Applied Surface Science (2008), 255(5, Pt. 2), 2730-2734). Previously nanoparticles coated with another metal or metal oxide has riot been produced by a reduction method of metal chlorides. Such material is not commercially available, wherein for example cobalt particles would be coated with copper.

In the present invention, costs of producing metal nanoparticles and coating thereof are attempted to reduce and the particles produced are attempted to bring in more homogenous and pure form, This way, for example, permeability of high frequency components, such as antennas, can be enhanced in order that they function more efficiently, and their size can be decreased correspondingly. Compared to these commonly used ferrite particles, permeability of the components can be increased more with ferromagnetic materials, such as cobalt. Optionally the copper oxide shell used as the coating increases for its part substantially the electrical conductivity of the particles.

The invention can also be utilized in production of magnetic insulation materials, by means of which antenna structures as well windings printed on circuit boards can be miniatyrized. Different antennas are continuously used increasingly among others in mobile devices and there is a great need for reducing their size.

BRIEF DESCRIPTION OF THE INVENTION

It is an aim of the present invention to provide new coated cobalt nanoparticles which are suitable to be utilized in high frequency components.

In particular, an aim of the present invention is to provide a new, easily realizable, continuous process for producing and coating of cobalt nanoparticles.

Thus, the present invention relates to a process for forming and coating cobalt nanoparticles with copper and copper oxide.

More specifically, the process according to the present invention is mainly characterized by what is stated in the characterizing part of claim 1.

Use of the process according to the invention is characterized what is stated in claim 10, and the cobalt nanoparticles produced by the process are characterized what is stated in claim 11.

In principle, the process of the present invention is continuous, wherein the process conditions are optimizable. Thanks to uniform process conditions as well as the inexpensive and pure starting materials the costs of the production stay lower and the material produced is more homogenous and pure than produced by the competitive processes.

DETAILED DESCRIPTION OF THE PREFERRED EMBODIMENTS OF THE INVENTION

The present invention relates to a process for forming and coating of cobalt nanoparticles with copper or copper oxide, wherein copper salt is mixed to the cobalt salt so that the cobalt to copper ratio becomes >1:1, and a hydrogen reduction is carried out, wherein the nanoparticles are formed while coating thereof starts.

The cobalt nanoparticles are produced by hydrogen reduction process of the metal salts. The application publication WO 2007/144455 describes a process applicable for the purpose.

In the present invention, the aforementioned or corresponding reduction carried out with hydrogen is carried out at the same time as the nanoparticies are coated with copper. Coating is based on the fact that those two metals (cobalt and copper) do not mix together, Since the reactions take place more quickly on the surface of the particles than in a gas phase and the reduction reaction of the metal salts takes place mainly on the surface of the formed particles, both metals (or metal salts) end up to the same nanoparticie, when both cobalt and copper salt are fed to the reactor being used for carrying out the process. When the mass fraction of cobalt is larger then copper, it forms the core of the particle and copper forms shell thereof By varying the mass fraction, the thickness of the copper shell can easily be adjusted. Likewise the size of the cobalt core and thus the magnetic properties of the particles can be adjusted by adjusting the mass fraction of cobalt during mixing the salts. The material formed has chemical properties of copper, but in addition it is ferromagnetic.

The salt mixture formed while mixing the salts is steamed from a porous bed to a reducing gas or a gas mixture containing a reducing gas, wherein a reaction mixture is formed.

According to a preferred embodiment of the invention, the steaming is carried out at a temperature of from 600 to 1000° C., preferably from 700 to 900° C. While steamed, the metal salts are preferably in the form of powders or liquids, more preferably as chlorides, nitrates, acetates, formates or sulphates or a mixture of more these kinds of salt, most suitably in form of cobalt chloride and copper chloride. The mentioned salts are of that kind, the evaporation temperature of which is lower than the decomposition temperature.

Reduction is carried out according the another preferred embodiment, for the evaporated mixture, or for the reaction mixture, at a temperature from 700 to 1000° C., preferably from 800 to 9:50° C., by using hydrogen as the reducing gas, which is most suitably added to the reaction mixture as part of the gas mixture containing nitrogen or argon as the carrier gas. When using the gas mixture, the proportion of the reducing gas in the mixture is preferably from 10 to 90%, typically from 20 to 50%.

In the reduction reaction the cobalt salt forming the core of the particle reacts with the reducing gas, wherein elemental cobalt and a salt corresponding to the acid are formed. While cobalt chloride reacts with hydrogen, cobalt and hydrogen chloride is formed consequently.

After the reduction, the product mixture formed is allowed to cool. Preferably the product mixture is cooled, for example by using a cold cooling gas, such as nitrogen or argon having temperature of −100 to +200° C., typically from 0 to 50° C. Cooling is preferably carried out as quickly as possible, whereupon sintering of the formed particles is avoided, According to an especially preferred embodiment of the invention, the core of the coated nanoparticles, that is the copper shell, is oxidized to an oxide so that cobalt in the core remains metallic, Typically the oxidation is carried out at a temperature of about 200° C., The electrically conductivity of this kind of an oxidized nanoparticle is substantially lower and depends on the thickness and the state of oxidation of the oxide shell. Due to the low electrical conductivity, electrical losses of the composite are low and thus it can be used for enhancing permeability of high frequency components.

The oxide shell also stabilizes the cobalt particles so that they remain metallic at least at a. temperature of 200° C., where among other the pure cobalt nanoparticles will burn immediately. Oxidation at the temperature of 200° C. leads to a fact that only copper oxide and metallic cobalt occur in the sample. Thus the copper oxide shell prevents oxidation of the cobalt core.

By the process of the present invention cobalt nanoparticles coated with copper or an oxide thereof are obtained. These coated nanoparticles have the cobalt to copper ratio >1:1 and. their coating is uniform, providing, among others, an efficient shield for the cobalt core, for instance against oxidative conditions. The average diameter of these coated particles is up to 200 nm, whereupon the particle core formed from cobalt has an average diameter up to 100 nm and the copper coating (or the copper oxide coating), or the shell, has an average thickness up to 50 nm.

A magnetic resonance phenomenon "Giant magneto-impedance" (GMI) between the thin copper and cobalt films is known. The phenomenon amplifies the measuring signal over 1000%, hence the material can be used for producing of a very sensitive magnetic field sensor. The resonance phenomena AMR and GMR. used in present sensors amplify the signal by 4% (AMR) and 20% (GMR). In addition, according to the published molecular dynamic modellings, a thin copper layer changes substantially the magnetic moment of the cobalt cluster. Thus the powder produced can be used also as a sensor material. Production of this kind of a sensor from the powder is essentially more inexpensive than the use of atomic films for the same purpose.

The invention claimed is:

1. A process for forming cobalt nanoparticles and coating them with copper or copper oxide, comprising the steps of:
   mixing a copper salt into a cobalt salt, wherein the formed salt mixture obtains a cobalt:copper ratio of >1:1 by mass, and
   carrying out a reduction with a reducing gas, whereby the nanoparticles are formed at the same time as a coating is formed on their surface.

2. The process according to claim 1, further comprising adjusting the particle size of the cobalt by adjusting the cobalt:copper ratio as well as the mass concentration of the starting materials during mixing.

3. The process according to claim 1, further comprising evaporating the formed salt mixture from a porous bed into the reducing gas or into a gas mixture containing the reducing gas, whereby a reaction mixture is formed.

4. The process according to claim 3, further comprising evaporating the metal salts into the gas of the reaction mixture from starting materials in the form of powders or liquids selected from the group of: chlorides, nitrates, acetates, formates of sulphates or as a mixture of several such salts, cobalt chloride and copper chloride.

5. The process according to claim 3, further comprising carrying out the evaporation at a temperature of from 600 to 1000 ° C.

6. The process according to claim 3, further comprising using hydrogen as the reducing gas, which is added to the reaction mixture as a part of a gas mixture containing nitrogen or argon as a carrier gas.

7. The process according to claim 6, further comprising carrying out the reduction at a temperature of from 700 to 1000 ° C.

8. The process according to claim 1, further comprising oxidizing the formed copper coating so that a copper oxide shell is formed around the cobalt core and the cobalt in the core of the particle remains metallic.

9. The process according to claim 1, wherein the formed coated cobalt nanoparticles have an average diameter of less than 200 nm.

10. Coated cobalt nanoparticles coated with copper or copper oxide, comprising being manufactured by mixing a copper salt into a cobalt salt, wherein the formed salt mixture obtains a cobalt:copper ratio >1:1 by mass, carrying out a reduction with a reducing gas, whereby the nanoparticles are formed at the same time as a coating on their surface, and wherein the cobalt nanoparticles have a cobalt:copper ratio of >1:1 by mass and their coating is uniform.

11. Coated cobalt nanoparticles according to claim 10, wherein the coated cobalt nanoparticles have an average diameter of less than 200 nm, their particle core formed from cobalt has an average diameter of up to 100nm, and their copper or copper oxide coating has an average thickness of up to 50 nm.

* * * * *